(12) United States Patent
Geilsdorf

(10) Patent No.: US 10,839,180 B2
(45) Date of Patent: Nov. 17, 2020

(54) OPTICAL SENSOR UNIT FOR AN INDUSTRIAL TRUCK AND METHOD OF OPERATING SAME

(71) Applicant: Jungheinrich Aktiengesellschaft, Hamburg (DE)

(72) Inventor: Hendrik Geilsdorf, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 16/385,607

(22) Filed: Apr. 16, 2019

(65) Prior Publication Data
US 2019/0318143 A1 Oct. 17, 2019

(30) Foreign Application Priority Data
Apr. 16, 2018 (DE) .................. 10 2018 108 956

(51) Int. Cl.
*G06K 7/10* (2006.01)
*G06K 7/14* (2006.01)

(52) U.S. Cl.
CPC ....... *G06K 7/10861* (2013.01); *G06K 7/1404* (2013.01)

(58) Field of Classification Search
CPC .................. G06K 7/10861; G06K 7/1404
(Continued)

(56) References Cited

U.S. PATENT DOCUMENTS 5,956,659 A 9/1999 Spies et al.
6,327,791 B1 * 12/2001 Norcross ............. F15B 15/2846
33/706
(Continued)

FOREIGN PATENT DOCUMENTS

DE 19712622 A1 10/1998
DE 10066149 B4 2/2005
(Continued)

OTHER PUBLICATIONS

EP 19169164; Apr. 15, 2019; EP Search Report dated Aug. 9, 2019; 5 pages.

*Primary Examiner* — Allyson N Trail
(74) *Attorney, Agent, or Firm* — Barclay Damon LLP

(57) ABSTRACT

A method is provided for operating an optical sensor unit comprising markings arranged on a piston rod of a cylinder of an industrial truck. The method, comprises the steps of: transmitting optical radiation onto markings arranged on the piston rod receiving optical radiation reflected by the markings arranged on the piston rod detecting an oscillating voltage signal by the receiver from the optical radiation reflected by the markings on the piston rod; converting the voltage signal into a binary digital signal; setting a control current applied to the transmitter as a control variable, specifying a target voltage amplitude from the detected oscillating voltage signal as a reference variable, determining an average actual voltage amplitude over a plurality of voltage fluctuations produced by traversal of a plurality of markings from the respective actual voltage amplitudes of the voltage signals, determining a control deviation value between a target voltage amplitude and an average associated with the actual voltage amplitudes of the voltage signals, and correcting the average associated with the actual voltage amplitudes of the voltage signals by changing the control current in dependence of the control deviation value.

18 Claims, 9 Drawing Sheets

(58) Field of Classification Search
USPC .......................................................... 235/454
See application file for complete search history.

(56) References Cited

U.S. PATENT DOCUMENTS

| | | | | |
|---|---|---|---|---|
| 7,259,553 | B2 * | 8/2007 | Arns, Jr. ............. | F15B 15/2846 |
| | | | | 324/207.25 |
| 7,552,671 | B2 * | 6/2009 | Neumann .......... | G01D 5/34761 |
| | | | | 91/1 |
| 2014/0021341 | A1 | 1/2014 | Nagae | |
| 2015/0362334 | A1 * | 12/2015 | Battisti ................ | G01D 5/2448 |
| | | | | 702/150 |
| 2016/0177981 | A1 * | 6/2016 | Maglione ............ | F15B 15/2876 |
| | | | | 92/5 R |
| 2016/0273560 | A1 | 9/2016 | Leichnitz et al. | |

FOREIGN PATENT DOCUMENTS

| | | |
|---|---|---|
| DE | 102015104201 A1 | 9/2016 |
| DE | 102016103721 A1 | 9/2017 |

* cited by examiner

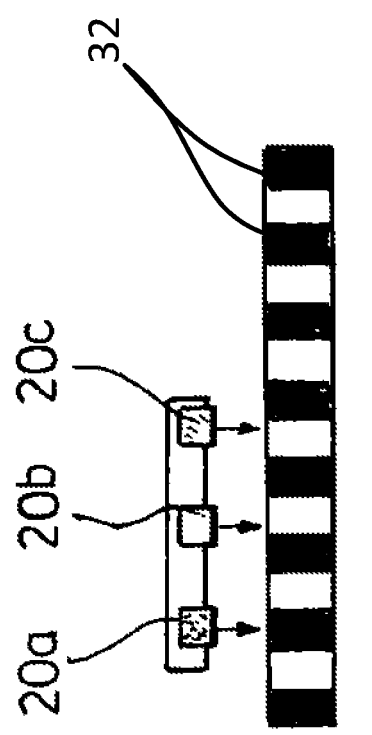
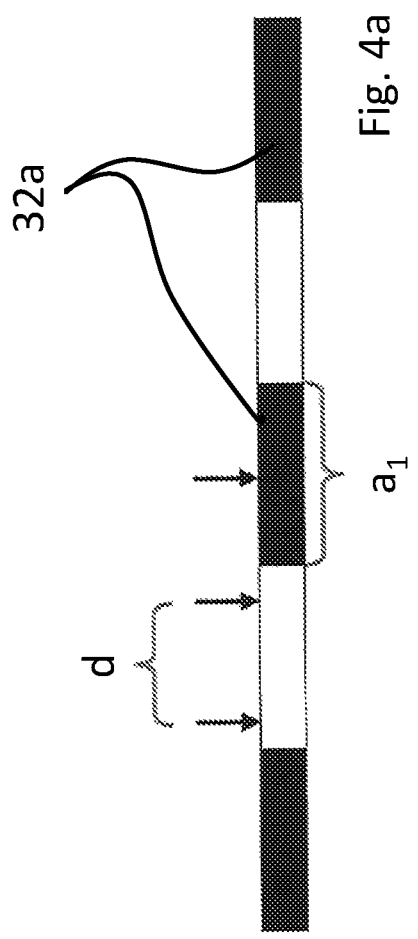
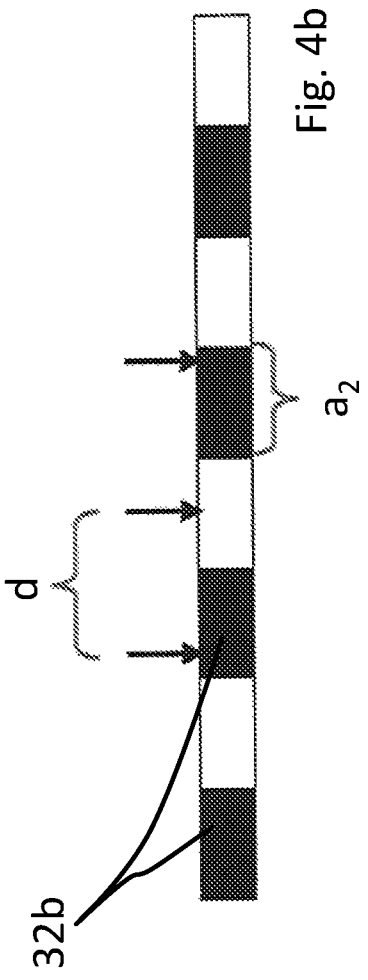

OPTICAL SENSOR UNIT FOR AN INDUSTRIAL TRUCK AND METHOD OF OPERATING SAME

CROSS REFERENCE TO RELATED DISCLOSURE

This application is based upon and claims priority to, under relevant sections of 35 U.S.C. § 119, German Patent Application No. 10 2018 108 956.2, filed Apr. 16, 2018, the entire contents of which are hereby incorporated by reference.

TECHNICAL FIELD

This disclosure relates to an optical sensor for an industrial truck and a method for operating the same. The optical sensor is incorporated into a unit which determines the extended position of a piston rod within a cylinder of the industrial truck.

BACKGROUND

Industrial trucks typically comprise one or more hydraulic cylinders, which are used to extend and retract the load part of the industrial truck along with the various mast stages of the lift mast. For proper operation of the industrial truck, it is desirable to accurately know the current operating lift height of the lift mast at any given time. Various sensors are known for performing this purpose, for example draw-wire sensors, toothed-belts or inductive proximity switches. Position-measuring systems on hydraulic cylinders are also known.

German Patents DE 10 2015 104 201 A1 and DE 10 2016 103 721 A1 each describe cylinders comprising a piston rod provided with indicia/markings read by an optical sensor. During extension or retraction of the piston rod, optical radiation emitted by the sensor unit sweeps over marked and unmarked regions alternately of the piston rod, which results in a periodic variation of the signal generated by the reflected radiation. The indicia/markings can, therefore, be counted, i.e., those extending past the radiation containment region, to determine the current extended position of the piston rod. In this case, it is of particular importance that the sensor unit recognize the markings in a consistently reliable manner. However, this can be difficult, as a consequence of the age of the components involved.

BRIEF SUMMARY OF THE DISCLOSURE

A method is provided for operating an optical sensor unit comprising markings arranged on a piston rod of a cylinder of an industrial truck. The method, comprises the steps of: transmitting optical radiation onto markings arranged on the piston rod receiving optical radiation reflected by the markings arranged on the piston rod detecting an oscillating voltage signal by the receiver from the optical radiation reflected by the markings on the piston rod; converting the voltage signal into a binary digital signal; setting a control current applied to the transmitter as a control variable, specifying a target voltage amplitude from the detected oscillating voltage signal as a reference variable, determining an average actual voltage amplitude over a plurality of voltage fluctuations produced by traversal of a plurality of markings from the respective actual voltage amplitudes of the voltage signals, determining a control deviation value between a target voltage amplitude and an average associated with the actual voltage amplitudes of the voltage signals, and correcting the average associated with the actual voltage amplitudes of the voltage signals by changing the control current in dependence of the control deviation value.

The extended position of the piston rod from the cylinder is determined by means of the sensor unit detecting the markings applied to the piston rod, as already mentioned above. The markings may in particular be arranged so as to be equidistant to one another on the piston rod. A periodic voltage signal is then produced in the receiver. The sensor unit may have one or more sensor elements that each have one transmitter and one receiver. The extended position may, in particular if only one sensor element is provided, be determined by counting the markings traversed. If several sensor elements are proded, the sequence of successive edges of the digital binary signals can in particular be used. A piston position can therefore be assigned to a combination of binary signals generated by the sensor elements by means of a logic stored in an evaluation unit, for example. The current piston position is therefore determined based on the distance measurement. In addition, the extension and/or retraction speed of the piston can also be concluded from the temporal change of the piston position. The recorded voltage fluctuation of the receiver is then converted into a digital binary signal by means of a digital converter, which binary signal is switched between two states. The binary signal may in particular take on the states 0 and 1, the state 0 corresponding to a higher voltage signal and thus being able to indicate a blank space on the piston rod and the state 1 corresponding to a lower voltage signal and thus being able to indicate a marking on the piston rod. Of course, the states may also be conversely defined. In particular, switching thresholds may be defined such that switching does not occur unintentionally during possible voltage signal noise. The resolution, i.e. the measure of accuracy of the piston position determination, is derived from the distance between the markings applied to the piston rod and, in the case of several sensor elements, from the distance between the sensor elements.

During long-term operation of the sensor unit and/or cylinder, signs of aging emerge in large numbers. For example, abrasion of the markings on the piston rod result in deteriorating contrast between the marked regions and the unmarked regions, which makes detection of the markings more difficult. Furthermore, aging of the sensor elements also leads to less reliable detection. The luminous intensity of the transmitters may thereby diminish. Finally, tolerances of the components involved in the system as well as temperature fluctuations and possibly slight condensation on the sensor element or piston rod due to cooling in humid air also impair the accuracy of the measurement. In this regard, it has been recognized that all of these error sources lead to a deviation in the voltage signal registered by the receiver on account of the drop in amplitude and a decrease of the average value. The accuracy of a potentially defined digital switching threshold may also be reduced as a result.

According to the disclosure, it is provided that this is compensated by changing the current $I_{ctrl}$ applied to the transmitter of the sensor element as a controlled variable. In this way, by increasing the control voltage $I_{ctrl}$, a loss of transmitter intensity and a loss of contrast between the markings on the piston rod can be compensated. This can be achieved according to the disclosure using the above-described regulation method, in particular in a fully automatic manner. Any control current can initially be specified for the transmitter, for example it can be determined beforehand using the method, as explained in more detail below. The control current $I_{ctrl}$ results in emission of optical radiation of a specific intensity by the transmitter. The radiation reflected on the piston rod is received by the receiver and results in the generation of a periodic voltage profile in the receiver on account of several markings being traversed. The optimal voltage amplitude $\hat{u}_{targ}$ is in this case specified as the reference variable. An average value $\hat{u}_{avg}$ of the actual voltage amplitudes $\hat{u}_{act}$ determined over several voltage fluctuations is subtracted from this predefined voltage amplitude $\hat{u}_{targ}$ and in this way a control deviation $\Delta\hat{u}=\hat{u}_{targ}-\hat{u}_{avg}$ is determined. The control deviation $\Delta\hat{u}$ is then used as input variable for regulating the current of the transmitter. The output voltage occurring in the receiver is therefore regulated by means of the input current applied to the transmitter, in particular by regulating the voltage amplitude of the output voltage to the average actual voltage amplitude ûavg. By taking into account the average actual voltage amplitude over several fluctuations of the periodic voltage, a more gentle regulation can be achieved; in particular, extreme values caused for example by particularly bright or dark sections can be compensated. In addition, switching thresholds can be defined, as explained in the following. If, for example, the transmitter, which may be an LED (light emitting diode) for example, then changes its characteristics due to aging or due to temperature differences, according to the disclosure, compensation occurs by changing the control current supplying the transmitter. The same applies when the markings wear away. Therefore, changing the control current counteracts a reduction in the detected signal, i.e. a reduction in the voltage amplitude occurring at the receiver. This ensures that recognition of the markings on the piston rod is always as reliable as possible.

According to one embodiment, the average actual voltage amplitude ûavg is corrected by increasing the control current Ictrl applied to the transmitter if the current actual voltage amplitude ûact exceeds the permissible positive control deviation $+\Delta\hat{u}$ and/or by reducing the control current Ictrl applied to the transmitter if the actual voltage amplitude ûact falls below the permissible negative control deviation $-\Delta\hat{u}$. The current Ictrl applied to the transmitter can therefore be increased when a positive control deviation $+\Delta\hat{u}$ is exceeded by a constant value and reduced when the value falls below a negative control deviation $-\Delta\hat{u}$ by a constant value. Ultimately, this is a range controller. In this case, regulation to the average actual voltage amplitude ûavg therefore only occurs if the current actual voltage amplitude ûact deviates from the target voltage amplitude by more than the amount of the control deviation. As a result, a specific reliable tolerance range is defined, within which no regulation initially takes place.

According to one embodiment, the average actual voltage amplitude ûavg is corrected by converting the determined control deviation $\Delta\hat{u}$ into the control current Ictrl of the transmitter to be set by means of a P, PI or PID controller. Controllers of this kind are well known.

According to another embodiment, the average actual voltage amplitude ûavg is corrected by regulating the control current $I_{ctrl}$ such that an average actual current $u_{avg}$ generated at the receiver is brought into line with a switching threshold if the current actual voltage amplitude $\hat{u}_{act}$ is within a range of $\pm\hat{u}$ around $\hat{u}_{targ}$, i.e. if $\hat{u}_{targ}-\Delta\hat{u}<\hat{u}_{act}<\hat{u}_{targ}+\Delta\hat{u}$. Therefore, in addition to the above-mentioned regulation, regulation also occurs in the case of a deviation of the voltage amplitude that is smaller than the amount of the control deviation $\Delta\hat{u}$. Regulation then occurs to a previously established switching threshold. The switching threshold in this case defines a limit range, the periodic voltage signal only being converted into the binary digital signal when this limit range is breached. If an upper and a lower switching threshold are defined, the average actual voltage $u_{avg}$ may for example be regulated to an average switching threshold. The switching threshold may for example be regulated by means of a P, PI or PID controller, as already described for the voltage amplitude. According to this embodiment, a regulation comprising three different regulation ranges occurs: A first regulation range is produced for $\hat{u}_{act}<\hat{u}_{targ}-\Delta\hat{u}$ and a second regulation range is produced for $\hat{u}_{act}>\hat{u}_{targ}+\Delta\hat{u}$, a regulation occurring by means of the above-mentioned switching regulation or by means of the P, PI or PID controller. The third regulation range is produced for $\hat{u}_{targ}-\Delta\hat{u}<\hat{u}_{act}<\hat{u}_{targ}+\Delta\hat{u}$.

According to another embodiment, the average actual voltage amplitude $\hat{u}_{avg}$ is calculated by determining the minimum values and maximum values of the actual voltage $u_{act}$ over several fluctuations and generating an average value. According to this embodiment, the amplitude average of the voltage occurring at the detector is determined using an in particular arithmetical average value calculation from the minimum and maximum values. This method is particularly simple. In principle, however, other methods for calculating the average value are also conceivable.

According to one embodiment, the voltage signal is converted into a binary digital signal once a predetermined switching threshold $u_{tres}$ has been reached and the switching threshold is regulated to an average value uavg of the actual voltages uact occurring at the receiver over several voltage fluctuations. In particular, as a first step, the average value uavg of the actual voltages uact occurring at the receiver may be determined over several voltage fluctuations. The predetermined switching threshold can be corrected by selecting the switching threshold nearest to uavg. On account of the above-mentioned influences as well as the resulting reduction in the amplitudes and the resulting shift in the average value of the voltage detected by the receiver, regular readjustment of a potentially defined switching threshold may also be necessary. According to this embodiment, this can be achieved using a corresponding regulation method. In this case, as a first step, the average value of the output voltage is determined over several fluctuations and, based on this average value, the nearest appropriate switching threshold is selected and specified, i.e. the switching threshold is regulated to the average value.

According to one embodiment, the method comprises a run-in phase for calibrating the sensor element. This may in particular be necessary when restarting an industrial truck comprising the sensor unit. In particular, it is useful for proper functioning of the sensor unit at the beginning of operation to adjust the control current of the transmitter, and potentially also the switching threshold, as quickly as possible to the currently prevailing environmental conditions. The run-in phase may in particular comprise three fluctuations of the voltage amplitude. In order to calibrate the sensor element, it may be provided to select the starting value of the control current of the transmitter to be so large, that when the piston rod moves, a voltage amplitude that is sufficiently large for calibration is produced in the transmitter. This is advisable in particular in the case of several sensor elements, since not all sensor elements are necessarily positioned in front of marks or blank spaces at the same time. At the beginning of the method, it is not known whether there is a darker mark or a lighter blank space or a transition between a mark and a blank space in front of the sensor element in question. In the first case, the maximum control current delivers an average output voltage, and in the second case delivers a maximum output voltage. Therefore, it may be provided to increase the control current or currents of the transmitter uniformly and continuously until at least one output voltage at the transmitter reaches its maximum value. This will be the case for the sensor element positioned in front of a blank space. Proceeding from the presently applied control currents, the transmitter current can be adjusted separately for each sensor element, the relevant control current being continuously increased, provided that the corresponding output voltage is less than a lower limit (in particular 1.0 V) and the relevant control current being continuously reduced, as long as the corresponding output current is greater than an upper limit (in particular 4.0 V). Using this method, it is ensured that, at the start of the piston rod movement, all sensor elements are in one region in which detectable voltage amplitudes that are at least sufficiently large are generated. The method works best with sensor elements, in particular LEDs, having similar characteristic values and it is also sufficiently robust for compensating possible tolerances. The following methods are in particular also conceivable for a run-in phase of this kind.

According to one embodiment, the sensor element is calibrated by recording the present actual current Iact of the transmitter when ending the method by switching off the sensor element and using the recorded actual current $I_{act}$ as the starting value for the control current Ictrl when restarting the method by switching on the sensor element. In this way, calibration can take place based on a previous run of the method according to the disclosure. A possibly provided switching threshold can also be initialized in this way. In addition, the temperature can be recorded and the current can be adapted according to a stored specification.

According to another embodiment, the average current voltage amplitude ûavg is determined over a first number of voltage fluctuations from the respective actual voltage amplitudes ûact of the voltage signals, the sensor element being calibrated by determining an average actual voltage amplitude ûavg over a second number of voltage fluctuations from the respective actual voltage amplitudes ûact of the voltage signals, determining a control deviation Δû=ûtarg−ûavg between the prespecified target voltage amplitude ûtarg and the average actual voltage amplitude ûavg, correcting the prespecified target voltage amplitude ûtarg by changing the control current Ictrl in dependence of the control deviation Δû, the second number of fluctuations being smaller than the first number of fluctuations. As an alternative or in addition to the mentioned use of recorded values, the parameters can therefore be adapted during the run-in phase. In this case, during the run-in phase, a smaller number of fluctuations of the voltage occurring at the receiver are measured than in the case of the regulation according to the disclosure. For example, during calibration, initially only the first three fluctuations may be taken into consideration, while after calibration, four or more fluctuations are always taken into consideration for the average value calculation. This regulation method is sufficient as a start for calibration.

According to another embodiment, at least two, preferably at least three sensor elements spaced apart along the longitudinal axis of the piston rod are provided with one transmitter and one receiver in each case. The sensor unit may therefore comprise several, in particular three, sensor elements, which each comprise a transmitter for emitting optical radiation onto the piston rod and a receiver for detecting the optical radiation reflected by the piston rod. The radiation detected in the relevant receiver generates an oscillating voltage signal in each case on account of the markings, which voltage signal is then converted into a binary digital signal in each case. Each of the sensor elements experiences regulation according to the method according to the disclosure. In the case of equidistant markings, the extended position of the piston rod can be determined in particular from the phase shift of the sensor elements. The extended position can also be determined by counting the successive edges of the digital binary signals generated from the voltage signals or by evaluating the successive edges of the binary signals, as already mentioned at the outset. In addition, by using several sensor elements, good spatial resolution and also redundancy can be achieved and the movement direction of the piston rod can be determined.

According to another embodiment, a switching request for converting one of the voltage signals of one of the sensor elements into a binary digital signal is stored if all remaining sensor elements already have the same binary switching state, the voltage signal being converted into the binary digital signal if the remaining sensor elements no longer all have the same binary switching state. In particular, a switching request may be stored if a digital output is to output the value 1 on account of the relevant voltage signal of one of the receivers but the digital outputs of all remaining sensor elements already have the value 1, the voltage signal being converted into the binary digital signal 1 if the remaining sensor elements no longer all have the switching state 1. It is important in particular for safety-critical applications that any possible fault can be detected by the system, for example by a connected evaluation unit. In particular, it must be possible to reliably detect a cable breakage, which, in the case of a design of all sensor outputs as "open collector outputs", results in the output of a HIGH level. In the case of three sensor elements, this corresponds to the switching state [111]. It must therefore be ensured that the state [111] cannot arise during normal operation. This could be the case, for example, by soiling of the piston rod. According to this embodiment, the provided solution to this problem—if a digital output is to output the value 1 on account of the voltage signal of one of the receivers—is that of checking whether the other digital outputs are already outputting a value 1 on account of the other sensor elements. If they are, no switching occurs, i.e. they do not assume the value 1, but rather only one switching request is stored. Switching only occurs if the other digital outputs no longer all have the value 1. Furthermore, it can be provided that a switching of this kind initially takes place if a digital output is to be switched to the value 0 on account of the voltage value at the relevant receiver. Subsequently, it can be checked whether there is a switching request for another digital output. If there is, said digital output is set to the value 1. By virtue of this method, it can be ensured that the state [111] does not occur. Furthermore, no switching edges are left out, but are merely slightly temporally shifted, which ensures sufficiently accurate position detection. A common electronic evaluation system may be provided for the explained evaluations. Furthermore, each sensor element may have separate, sensor-internal evaluation units.

According to another embodiment, the voltage amplitude set by means of the predefined control current Ictrl is regulated in the receiver to approximately ⅓ of the maximum voltage amplitude that can be achieved based on the output of the transmitter. This voltage amplitude has proven to be a preferable compromise between a long service life of the transmitter, which requires a low amplitude, and reliable signal detection, which requires a high amplitude. As explained above, however, the older the system components, the higher the control current needed to maintain the desired voltage amplitude. Regulation according to the disclosure therefore takes place proceeding from the given starting value.

The optical sensor unit according to the disclosure for determining the extended position of a piston rod of a cylinder of an industrial truck comprises at least one sensor element comprising a transmitter for emitting optical radiation onto the piston rod and a receiver for detecting the optical radiation reflected by the piston rod for the purpose of detecting markings arranged on the piston rod, the detected radiation generating an oscillating voltage signal in the receiver on account of the markings, which voltage signal is then converted into a binary digital signal, the sensor unit comprising an electronic evaluation system that is configured to: specify a target voltage amplitude $\hat{u}_{targ}$ occurring at the receiver as the reference variable, set a control current $I_{ctrl}$ applied to the transmitter as the controlled variable, determine an average actual voltage amplitude $\hat{u}_{avg}$ over several voltage fluctuations produced by traversal of several markings from the respective actual voltage amplitudes $\hat{u}_{act}$ of the voltage signals, determine a control deviation $\Delta\hat{u}=\hat{u}_{targ}-\hat{u}_{avg}$ between the target voltage amplitude $\hat{u}_{targ}$ and the average actual voltage amplitude $\hat{u}_{avg}$, and correct the average actual voltage amplitude $\hat{u}_{avg}$ by changing the control current $I_{ctrl}$ in dependence of the control deviation $\Delta\hat{u}$.

The optical sensor unit is suitable for performing the method according to the disclosure. The above-made statements on the method according to the disclosure accordingly also apply to the optical sensor unit. The transmitter of the sensor element may in particular be an LED. Several, in particular three, sensor elements may be provided with one transmitter and one receiver in each case. The markings may in particular be arranged so as to be equidistant to one another on the piston rod. A periodic voltage signal is then produced in the receiver.

According to one embodiment, the optical sensor unit comprises at least two, in particular three, equidistant sensor elements, which are arranged so as to be connected to a cylinder and spaced apart along the longitudinal axis of the piston rod. The extended position of the piston rod can in this case be determined as described above.

According to another embodiment, the optical sensor unit comprises a sensor housing having a main body and a sensor portion projecting from the main body, the main body comprising a first circuit board having an electronic evaluation system and the sensor portion comprising a second circuit board having the at least one sensor element, the projecting sensor portion being designed for connection to the cylinder. The main body may be designed to be cuboid, for example. In particular, the main body may be designed for attachment to a cylinder housing of the cylinder. For this purpose, the housing may for example have a latching lug that latches in a recess of the cylinder housing. The sensor portion may be cylindrical and be designed for accommodation in a receiving opening in the cylinder. The second circuit board may comprise a heating element for heating the sensor element or elements in order to prevent condensation.

A cylinder according to the disclosure, in particular a hydraulic cylinder, for an industrial truck comprises a cylinder housing, a piston that is arranged in the cylinder housing so as to move relative thereto, a piston rod which adjoins the piston and on which a marking comprising equidistantly arranged marks is arranged, and an optical sensor unit according to the disclosure directed toward said marking. A cylinder of this kind may be arranged in or on an industrial truck and serve to extend and retract the lift mast and/or the load part.

BRIEF DESCRIPTION OF THE DRAWINGS

One exemplary embodiment of the disclosure is explained below using figures. In the figures:

FIG. 3 is a schematic representation of equidistant markings and three sensor elements, FIG. 4a is a schematic representation of markings in a first configuration, FIG. 4b is a schematic representation of markings in a second configuration.

DETAILED DESCRIPTION OF THE DISCLOSURE

If not otherwise specified, the same reference numbers indicate the same objects below.

Figure 1:
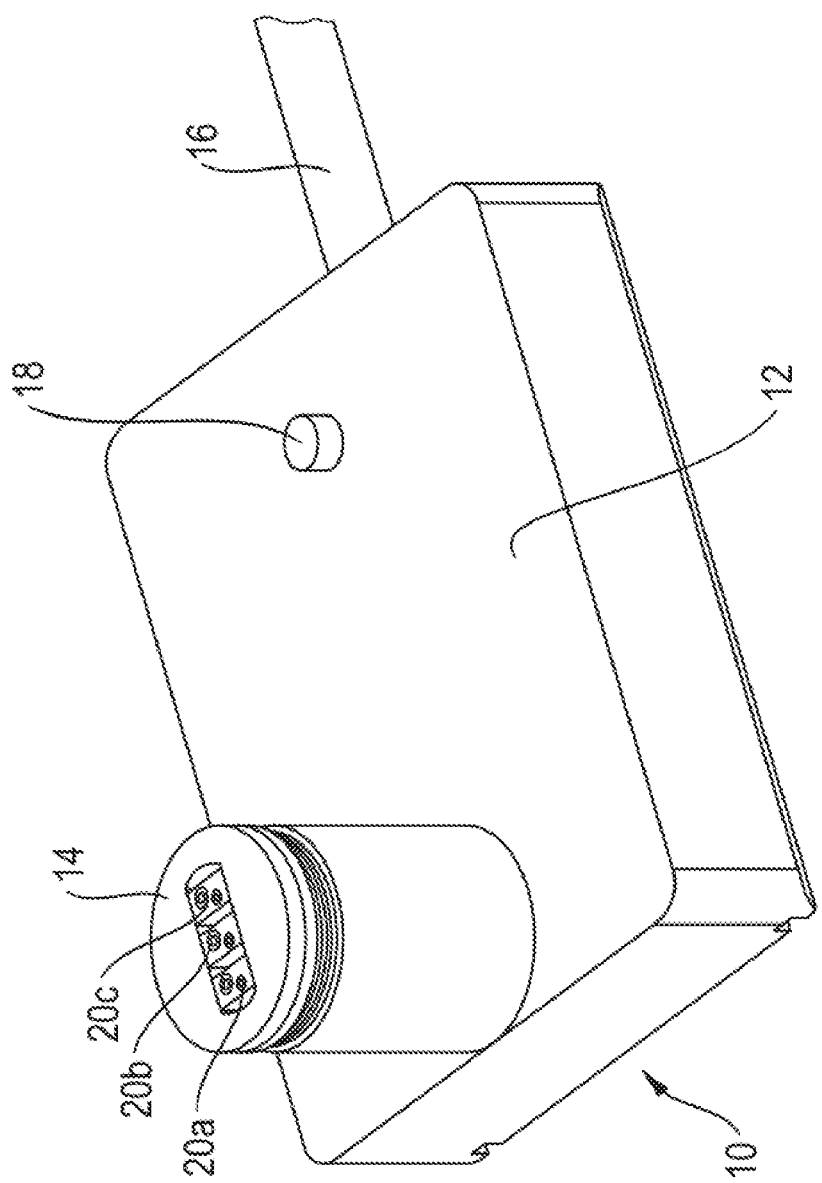
FIG. 1 is a perspective view of an optical sensor unit according to the disclosure.
Figure 5:
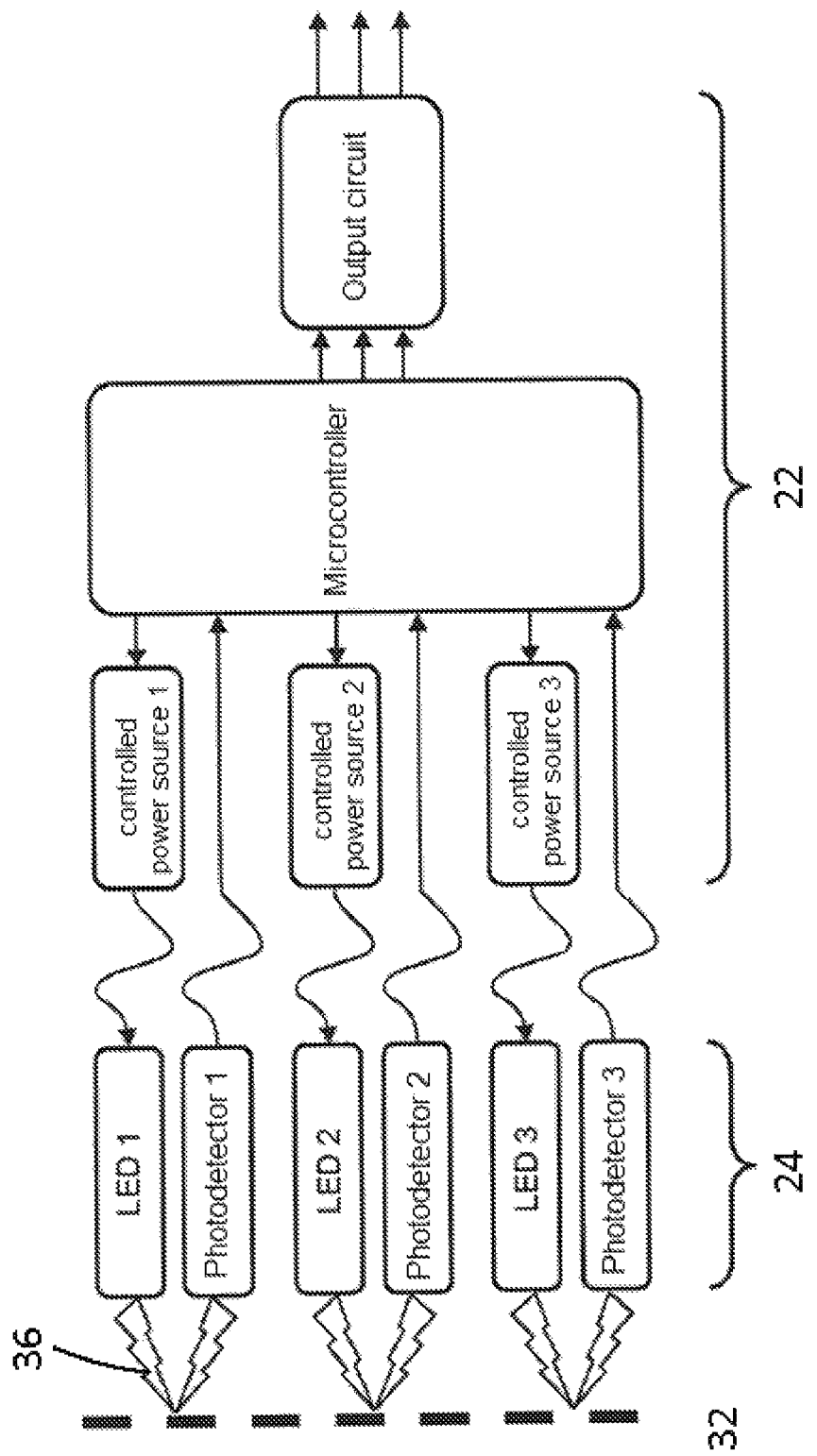
FIG. 5 is a schematic representation of the electrical design of the optical sensor unit.

FIGS. 1 and 5 show an example design of the sensor unit according to the disclosure. The sensor unit 10 comprises a cuboid, or cube-shaped, main body 12 and a sensor portion 14 that projects from the main body 12. The sensor unit 10 also includes a connection cable 16 and a latching lug 18 for attaching the sensor unit 10 to a cylinder of the industrial truck. The sensor portion 14 is designed for insertion into an opening of the cylinder and has three sensor elements 20a, 20b and 20c, each comprising one transmitter and one receiver, i.e., one transceiver. The transmitters may, in particular, be designed as LEDs in this case. The main body 12 includes a first circuit board 22 while the sensor portion 14 includes a second circuit board 24, which are shown schematically in FIG. 5. The first circuit board 22 comprises a microcontroller having three controlled power sources for controlling the transmitters designed as LEDs and also comprises an output circuit for outputting the signals, for example to a vehicle control system. The second circuit board 24 comprises three sensor elements 20a, 20b, 20c, which each have a photodetector in addition to the LEDs or transmitters.

Figure 2:
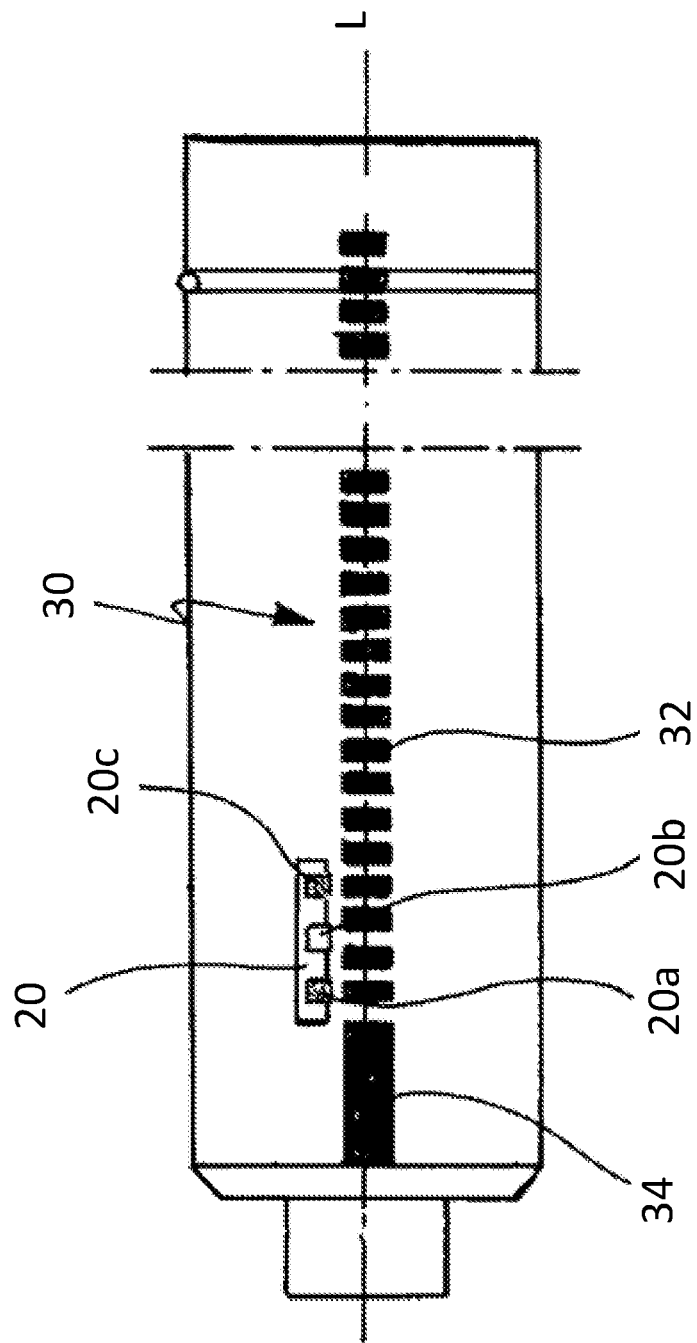
FIG. 2 is a schematic representation of a piston rod comprising markings arranged thereon and three sensor elements.

FIG. 2 is a schematic view of a piston rod 30 extending along a longitudinal axis L with applied, equidistant markings 32. In addition, a reference marking 34 can be seen, which has a sufficient length such that it can be detected by all sensor elements 20a, 20b, 20c at the same time. By means of the reference marking 34, a starting position of the piston rod 30 can therefore be reliably determined. The sensor unit 10 comprising the three sensor elements 20a, 20b, 20c thereof is shown schematically in portions in FIG. 2. As receivers, the sensor elements 20a, 20b, 20c may, for example, have a photodiode that is tuned to the light-emitting diode or a phototransistor. The sensor elements 20a, 20b, 20c emit an optical signal via the transmitters thereof which is reflected by the piston rod 30 and attenuated proportionally in regions of the markings 32 on account of the darker color thereof. When the piston rod retracts or extends from the cylinder housing thereof, the piston rod runs along the sensor unit 10, as a result of which a periodic voltage signal is generated in each of the sensor elements 20a, 20b, 20c. This scanning of the marking 32 by the sensor elements is shown schematically in FIG. 3.

The position resolution is in this case dependent on the distance between adjacent sensor elements and the distance between adjacent markings. Two markings 32a, 32b of different widths and different spacings are shown schematically in FIGS. 4a and 4b. The distance of the sensor elements 20a from 20b and 20b from 20c is the same in both cases and is denoted by the letter d. In FIG. 4a, the mark and/or blank space width is a1=3/2*d and therefore results in a position resolution of 0.5 d. In the configuration shown in FIG. 4b, the mark and/or blank space width is a2=3/4*d and therefore results in a higher position resolution of 0.25 d. The position resolution is higher in the second example, which in principle allows for a more accurate determination of the extended position of the piston. However, tolerances have more influence with regard to the markings. In addition, in the exemplary embodiment shown in FIG. 4b, in contrast to the exemplary embodiment shown in FIG. 4a, the rising and falling edges of the binary signal generated from the received voltage signal are not generated one after the other by the same mark and blank space, respectively, but rather by different marks and blank spaces, respectively. This additionally results in possible tolerances of the markings having a particularly large influence on the measurement result.

The electrical design of the sensor unit is schematically shown in FIG. 5, as already mentioned above. As can be seen in this figure, a microcontroller controls the LEDs of the sensor elements 20a, 20b, 20c via three separate power sources and causes said LEDs to emit optical radiation 36. The optical radiation 36 is reflected at the markings 32 on the piston rod 30 and captured by the photodetectors of the optical sensor elements 20a, 20b, 20c. A periodic voltage signal is therefore generated in the photodetectors on account of the movement of the piston rod, which voltage signal is in turn converted into a binary output signal by means of the microcontroller via an output circuit.

Figure 6:
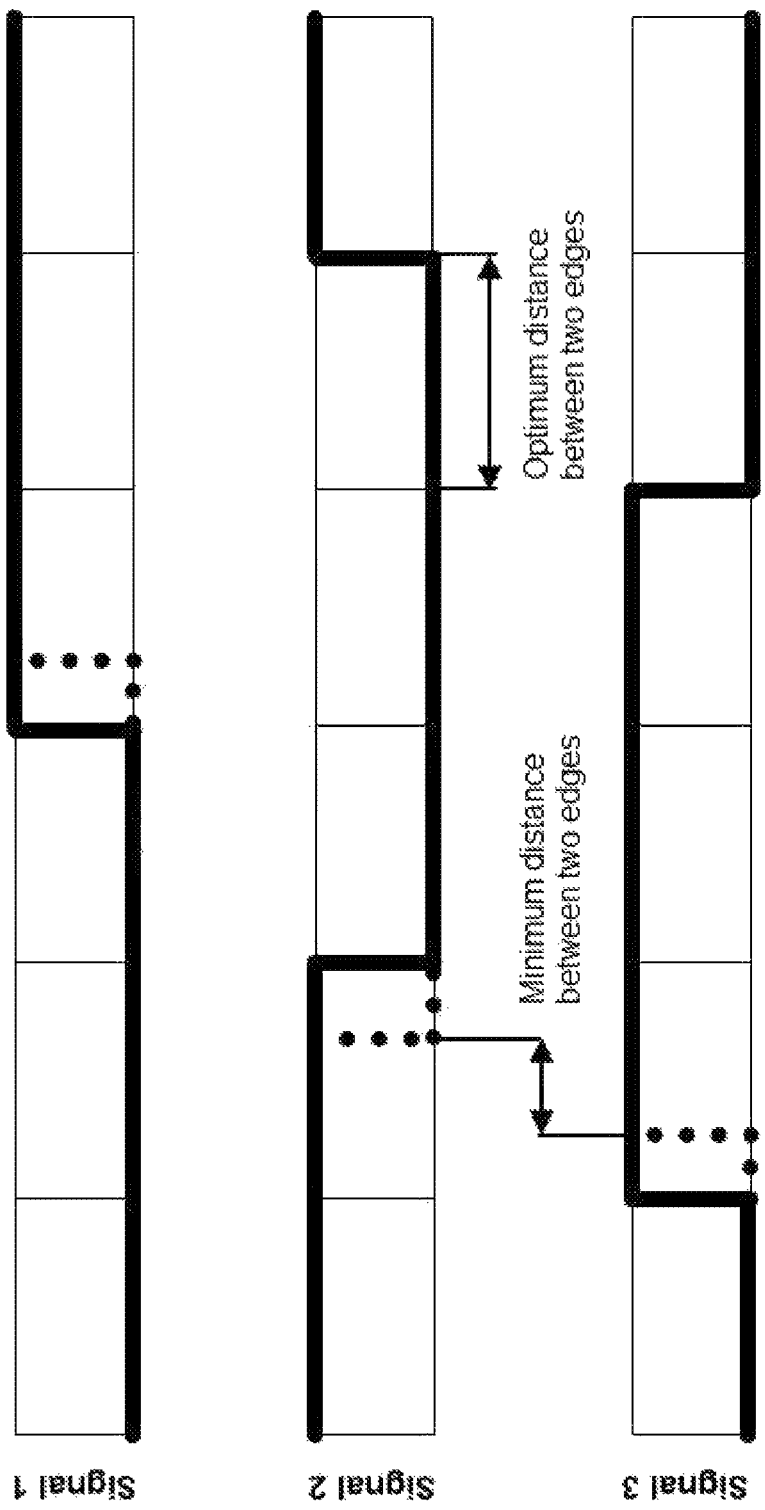
FIG. 6 shows the binary switching signals of the three sensor elements.

FIG. 6 shows a temporal progression of the binary, digital output signals 1-3 of the sensor elements 20a, 20b, 20c. The binary digital signal can take on the states 1 and 0, the state 1 defining a marking and the state 0 defining a blank space, as explained at the outset. On account of the three sensor elements, there are three such digital signals. The two states that can be taken on by the digital signals can be clearly seen. With every registered edge, i.e. with every state change of the digital signal, the distance covered by the piston rod can be incremented by a specified amount. In this case, a defined optimum distance is defined between two successive edges of the signals of different sensor elements. This is produced from the ratio of the distance d between adjacent sensor elements and the distance between markings and/or blank spaces. In order to ensure reliable scanning, it is advisable to ensure a minimum distance between two successive edges even in the case of the tolerances of and age-related changes to the markings. Further details on this can be found in DE 10 2015 104 201 A1. Furthermore, as explained at the outset, the incremental piston position can also be determined from the sequence and number of successive edges. For example, the overall signal generated by the three sensor elements may be [101]. The first sensor element and the third sensor element are in this case positioned over a marking, while the second sensor element is positioned over a blank space.

Figure 7:
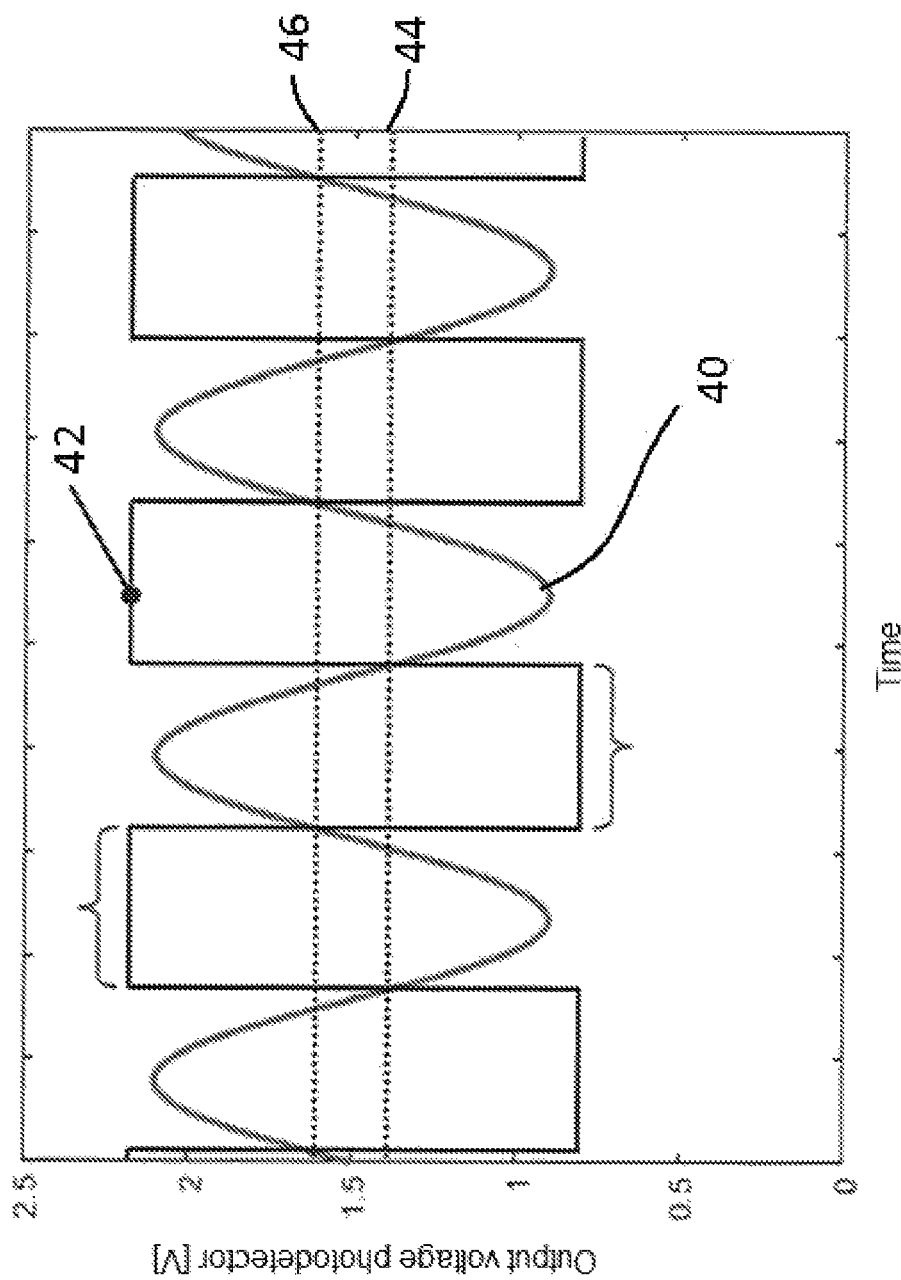
FIG. 7 is a diagram of the ideal output voltage of the receiver.

FIG. 7 shows an idealized form of the output voltage $U_{act}$, denoted here by reference number 40, at one of the photodetectors, i.e. at the receiver. The output voltage 40 follows a sinusoid having an average value of 1.5 V. In addition, the binary digital signal 42 generated from said output voltage 40 is also shown. The digital signal is switched between both states 0 and 1 thereof if the output voltage 40 falls below a lower switching threshold 44 or exceeds an upper switching threshold 46. By defining the upper and lower switching threshold 44, 46, it is ensured that no undesired switching occurs, for example on account of noise in the output voltage 40. The example shown here shows switching in opposite directions. However, switching in the same direction is also conceivable.

Figure 8:
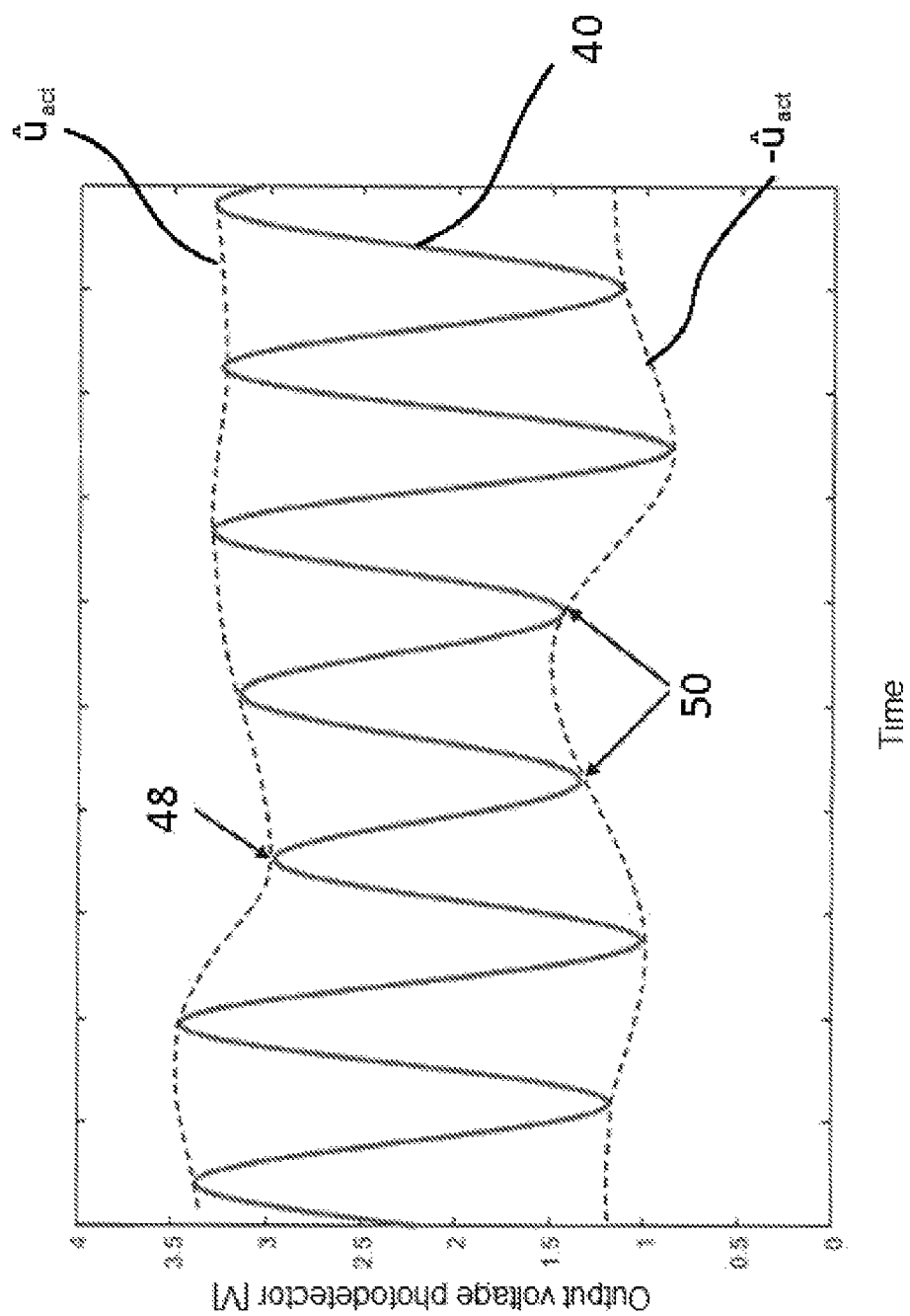
FIG. 8 is a diagram of the actually occurring output voltage of the detector.

However, during actual operation of the optical sensor unit, an ideal sinusoidal signal of the output voltage 40 is not generally produced, but rather variations in the amplitude $\hat{u}_{act}$, as shown in FIG. 8. Such variations in the voltage amplitude $\hat{u}_{act}$ are caused, for example, by changes to the markings on the piston rod, for example a blank space 48 that reflects less strongly or markings 50 that have become lighter. Furthermore, the aging of the LEDs results in the voltage signals generated by the receiver deviating from the ideal form thereof. Ultimately, these error sources result in a decrease in the amplitude and a decrease in the average value of the output voltage 40 with respect to the ideal periodic signal.

Figure 9:
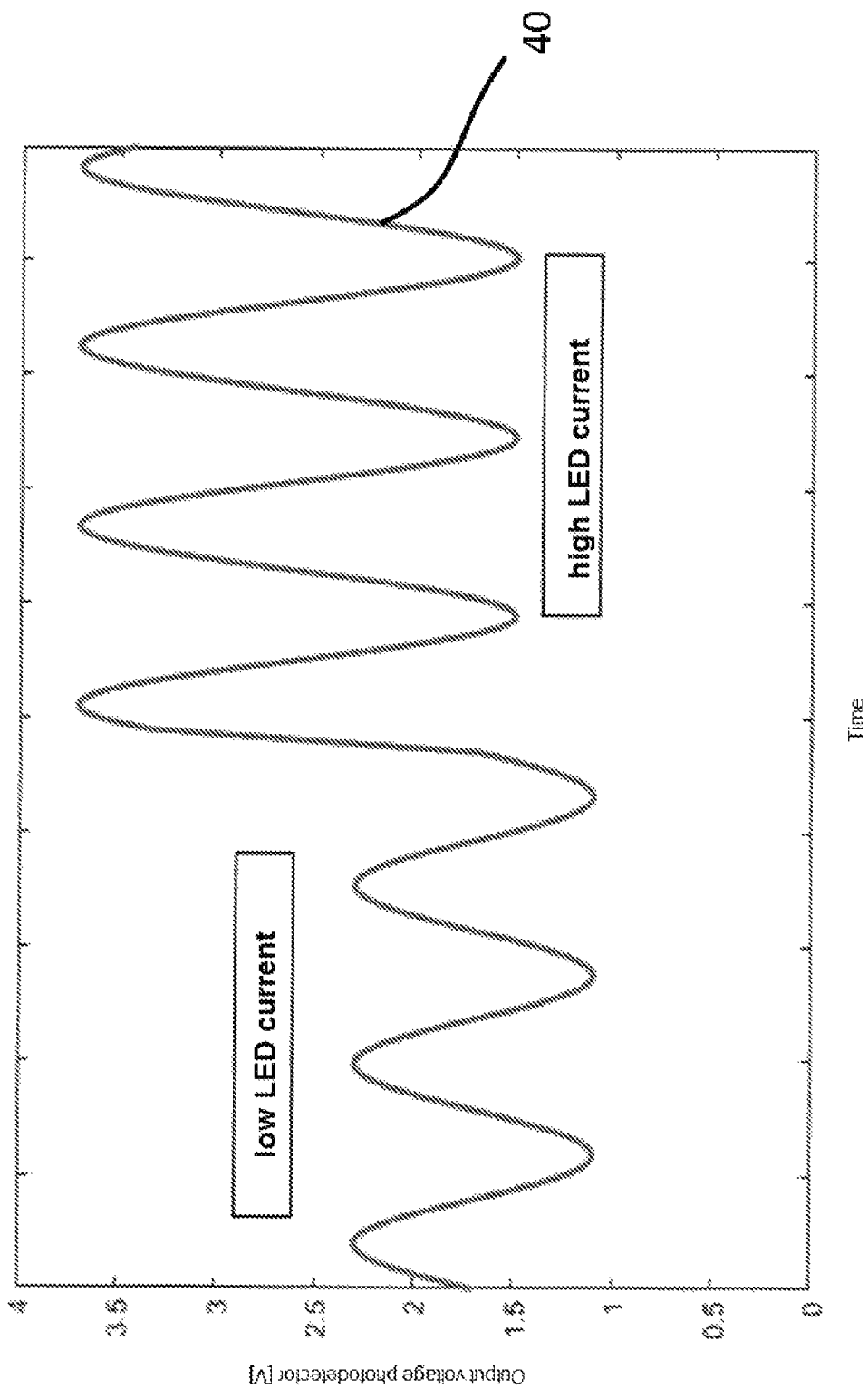
FIG. 9 shows the output voltage of the detector in the presence of different transmitter currents.

According to the disclosure, it is therefore provided that such changes are compensated by sensor-internal regulation. For this purpose, the currents of the transmitters supplying the sensor elements 20a, 20b, 20c are regulated such that the output voltage 40 occurring at the receivers results in the long term in a signal that is as steady as possible. In this way, for example, aging of the LEDs is compensated by a corresponding increase in the LED current. As shown in FIG. 9, an increase in the LED current results in an increase in the amplitude and an increase in the average value of the output voltage 40 occurring at each of the photodetectors. Therefore, the variations in output voltage 40 brought about by the above-mentioned effects can be compensated by regulation of the LED current as controlled variable.

Figure 10:
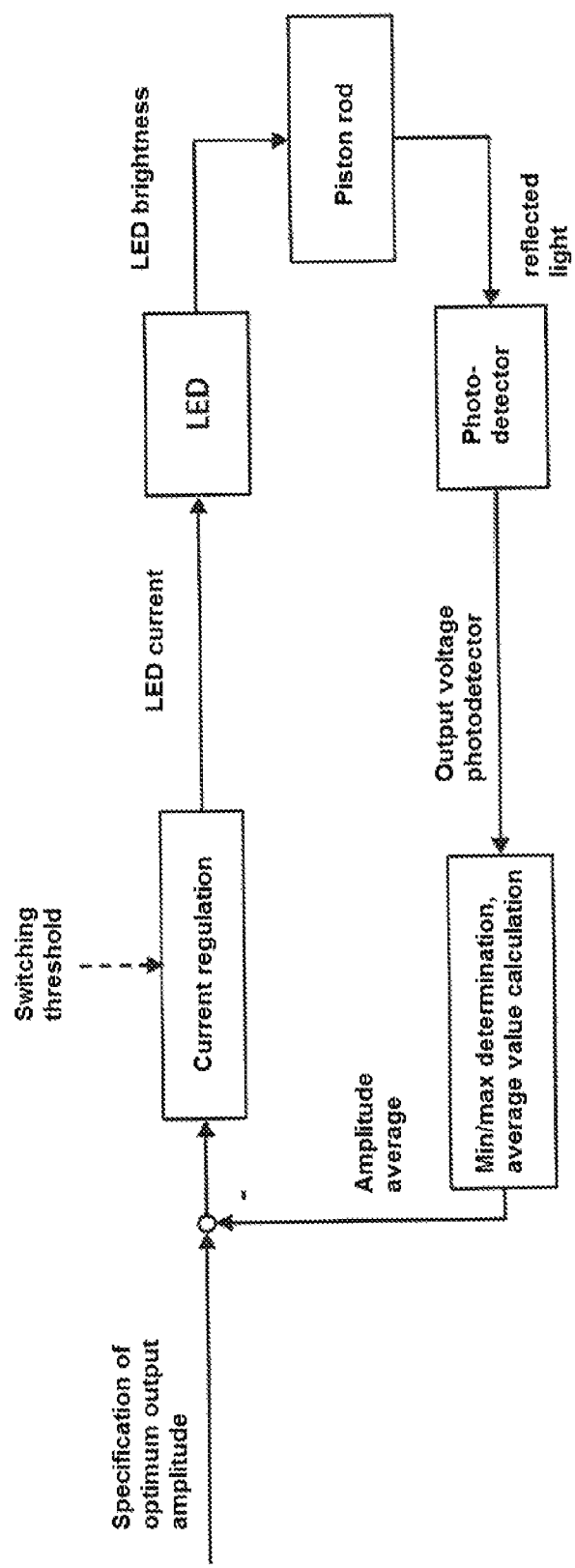
FIG. 10 shows the regulation scheme according to the disclosure.

The regulation method according to the disclosure is shown schematically in FIG. 10. As shown in this figure, a target voltage amplitude ûtarg is initially specified as the reference variable for each receiver. This is set by accordingly selecting a control current Ictrl for each transmitter of the sensor elements 20a, 20b, 20c. For this purpose, each sensor element has a separate, independently controllable power source, as shown in FIG. 5. The output voltages Uact of all three sensor elements occurring at the receivers is recorded over several fluctuations, i.e. over several markings, by means of the microcontroller. Subsequently, on the basis of the known actual voltage amplitudes ûact of the respective signals, the microcontroller determines an average actual voltage amplitude ûavg and subsequently the control deviations Δû=ûtarg−ûavg between the relevant target voltage amplitude ûtarg and the relevant average actual voltage amplitude ûavg. By subsequently changing the control current Ictrl, the average actual voltage amplitude ûavg is corrected. The amplitude of the voltage signal is then regulated to a target value.

It is important in particular for safety-critical applications that any possible fault can be detected by the system, for example by a connected evaluation unit. In particular, it must be possible to reliably detect a cable breakage, which, in the case of a design of all sensor outputs as "open collector outputs", results in the output of a HIGH level, i.e. the state [111]. It must therefore be ensured that the state [111] cannot arise during normal operation. This could be the case, for example, by soiling of the piston rod. The provided solution to this problem—if a digital output is to output the value 1 on account of the voltage signal of one of the receivers—is that of an in particular sensor-internal evaluation unit checking whether the other digital outputs are already outputting a value 1 on account of the other sensor elements. If they are, no switching occurs, i.e. they do not assume the value 1, but rather only one switching request is stored. Switching only occurs if the other digital outputs no longer all have the value 1. A switching of this kind initially takes place if a digital output is to be switched to the value 0 on account of the voltage value occurring at the relevant receiver. Subsequently, it is checked whether there is a switching request for another digital output. If there is, said digital output is set to the value 1. By virtue of this method, it can be ensured that the state [111] does not occur. Furthermore, no switching edges are left out, but are merely slightly temporally shifted, which ensures sufficiently accurate position detection.

LIST OF REFERENCES NUMBERS

10 Sensor unit
12 Main body
14 Sensor portion
16 Connection cable
18 Latching lug
20a, 20b, 20c Sensor elements
22 First circuit board
24 Second circuit board
30 Piston rod
32 Markings
34 Reference marking
36 Optical radiation
40 Output voltage
42 Binary digital signal
44, 46 Switching thresholds
48 Blank space
50 Marking
$a_1$, $a_2$ Distances between adjacent markings/blank spaces
d Distance between adjacent sensor elements
L Longitudinal axis of the piston rod

The invention claimed is:

1. A method for operating a sensor unit of an industrial truck, comprising the steps of:
    transmitting optical radiation onto a plurality of markings arranged on a piston rod of the industrial truck, by a transmitter;
    receiving optical radiation reflected by the plurality of markings arranged on the piston rod, by a receiver;
    detecting an oscillating voltage signal from the optical radiation reflected by the plurality of markings arranged on the piston rod;
    converting the voltage signal into a binary digital signal;
    setting a control current applied to the transmitter as a controlled variable;
    specifying a target voltage amplitude from the detected oscillating voltage signal as a reference variable;
    determining an average actual voltage amplitude over a plurality of voltage fluctuations produced by traversal of the plurality of markings from the respective actual voltage amplitudes of the voltage signals;
    determining a control deviation value between a target voltage amplitude and an average associated with the actual voltage amplitudes of the voltage signals; and
    correcting the average associated with the actual voltage amplitudes of the voltage signals by changing the control current in dependence of the control deviation value.

2. The method according to claim 1 wherein the step of correcting the average actual voltage amplitude comprises the step of:
    increasing the control current applied to the transmitter when the actual voltage amplitude exceeds a permissible positive control deviation value.

3. The method according to claim 1 wherein the step of correcting the average actual voltage amplitude comprises the step of:
    decreasing the control current applied to the transmitter when the actual voltage amplitude falls below a permissible negative control deviation value.

4. The method according to claim 1 wherein the step of correcting the average actual voltage amplitude comprises the step of converting the determined control deviation value into the control current of the transmitter to be set by means of one of a proportional controller, proportional-integral controller and a proportional-integral-differential controller.

5. The method according to claim 2 wherein the step of correcting the average actual voltage amplitude comprises the step of regulating the control current such that an average actual current $u_{avg}$ generated at the receiver is brought into line with a switching threshold if the current actual voltage amplitude is within a range of between the difference between the target voltage amplitude and the control deviation value ($\hat{u}_{targ} - \Delta\hat{u}$) and the summation between the target voltage amplitude and the control deviation value ($\hat{u}_{targ} + \Delta\hat{u}$).

6. The method according to claim 1 wherein the step of correcting the average actual voltage amplitude comprises the step of determining the minimum and maximum values of the actual voltage over the plurality of fluctuations and determining an average of the plurality of fluctuations.

7. The method according to claim 1 wherein the step of correcting the average actual voltage amplitude comprises the step of:
    converting the voltage signal into a binary digital signal once a predetermined switching threshold has been reached and regulating the predetermined switching threshold to an average value of the actual voltages occurring at the receiver over a plurality of voltage fluctuations.

8. The method according to claim 1 wherein the step of correcting the average actual voltage amplitude comprises calibrating a sensor element by a run-in phase.

9. The method according to claim 8 wherein the step of calibrating the sensor elements comprises:
    recording the actual current of the transmitter when switching-off the sensor elements and using the recorded actual current as a starting value for the control current when switching-on the sensor elements.

10. The method according to claim 9 further comprising the steps of:

determining an average actual voltage amplitude over a second number of voltage fluctuations from the respective actual voltage amplitudes of the voltage signals;

determining a control deviation value between a pre-specified target voltage amplitude value $\hat{u}_{targ}$ and the average actual voltage amplitude;

correcting the pre-specified average actual voltage amplitude $\hat{u}_{avg}$ by changing the control current in dependence of the control deviation; and wherein the second number of fluctuations is smaller than the first number of fluctuations.

11. The method according to claim 1 wherein at least of the sensor elements are spaced apart along the longitudinal axis of the piston rod.

12. The method according to claim 11 wherein a switching request is stored for converting one of the voltage signals of one of the sensor elements into a binary digital signal if all remaining sensor elements already comprise the same binary switching state; and wherein the voltage signal is converted into the binary digital signal if the remaining sensor elements no longer all comprise the same binary switching state.

13. The method according to claim 12 wherein the voltage amplitude set by a predefined control current is regulated in the receiver to about ⅓rd of the maximum voltage amplitude achievable based on the output of the transmitter.

14. An optical sensor unit for determining an extended position of a piston rod of a cylinder of an industrial truck, comprising:

at least one sensor element comprising a transmitter for emitting optical radiation onto the piston rod, and a receiver for detecting the optical radiation reflected by the piston rod for the purpose of detecting markings arranged on the piston rod, the detected radiation energy generating an oscillating voltage signal in the receiver as a consequence of the of the markings, which voltage signal is then converted into a binary digital signal, the sensor unit further comprising an evaluation system configured to:

specify a target voltage amplitude occurring at the receiver as a reference variable;

set a control current applied to the transmitter as a control variable;

determine an average actual voltage amplitude over several voltage fluctuations produced by traversal of several markings from the respective actual voltage amplitudes of the voltage signals;

determine a control deviation between the target voltage amplitude and the average actual voltage amplitude; and correct the average actual voltage amplitude by changing the control current in dependence of the control deviation.

15. The optical sensor unit according to claim 14 wherein at least two sensor elements are connected to the cylinder and equidistantly-spaced along the longitudinal axis of the piston rod.

16. The optical sensor unit according to claim 14 wherein a sensor housing comprises a main body and a sensor portion projecting from the main body, the main body comprising a first circuit board with an electronic evaluation system, and the sensor portion comprising a second circuit board with at least one sensor element, the projecting sensor portion being configured for connection to the cylinder.

17. The optical sensor unit according to claim 14, wherein the cylinder is a hydraulic cylinder configured to receive a piston that is arranged in a cylinder housing so as to move relative thereto, the piston rod adjoining the piston, wherein the markings on the piston rod are radiation attenuating markings, and wherein the optical sensor unit is configured for transmitting and receiving reflected radiation signals from the radiation attenuating markings to accurately determine the extension of the piston rod relative to the cylinder housing.

18. A cylinder for an industrial truck comprising:

a piston arranged in a cylinder housing so as to move relative thereto;

a piston rod adjoining the piston, wherein the piston rod comprises radiation markings on the piston rod; and an optical sensor unit for determining an extended position of the piston rod of the cylinder comprising:

at least one sensor element comprising a transmitter for emitting optical radiation onto the piston rod, and a receiver for detecting the optical radiation reflected by the piston rod for the purpose of detecting the radiation markings arranged on the piston rod, the detected radiation energy generating an oscillating voltage signal in the receiver as a consequence of the of the radiation markings, which voltage signal is then converted into a binary digital signal, the sensor unit further comprising an evaluation system configured to:

specify a target voltage amplitude occurring at the receiver as a reference variable;

set a control current applied to the transmitter as a control variable;

determine an average actual voltage amplitude over several voltage fluctuations produced by traversal of several radiation markings from the respective actual voltage amplitudes of the voltage signals;

determine a control deviation between the target voltage amplitude and the average actual voltage amplitude; and correct the average actual voltage amplitude by changing the control current in dependence of the control deviation.

* * * * *